(12) United States Patent
Usui et al.

(10) Patent No.: US 10,264,233 B2
(45) Date of Patent: Apr. 16, 2019

(54) CONTENT REPRODUCING APPARATUS AND CONTENT REPRODUCING METHOD

(71) Applicant: Yamaha Corporation, Hamamatsu-shi, Shizuoka-Ken (JP)

(72) Inventors: Atsushi Usui, Hamamatsu (JP); Masaya Kano, Hamamatsu (JP); Ryotaro Aoki, Hamamatsu (JP); Kohei Sekiguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/698,719

(22) Filed: Sep. 8, 2017

(65) Prior Publication Data

US 2017/0374337 A1 Dec. 28, 2017

Related U.S. Application Data

(63) Continuation of application No. PCT/JP2016/065462, filed on May 25, 2016.

(51) Int. Cl.
*H04N 5/765* (2006.01)
*H04N 9/87* (2006.01)
(Continued)

(52) U.S. Cl.
CPC ............ *H04N 9/87* (2013.01); *G11B 27/00* (2013.01); *H04N 5/76* (2013.01); *H04N 21/43615* (2013.01); *H04N 21/8113* (2013.01)

(58) Field of Classification Search
USPC ................................. 386/248, 231
See application file for complete search history.

(56) References Cited

U.S. PATENT DOCUMENTS

| | | | |
|---|---|---|---|
| 2005/0069280 A1* | 3/2005 | Chen ................. | H04N 5/85 386/336 |
| 2007/0192782 A1* | 8/2007 | Ramaswamy ......... | H04H 60/37 725/9 |

(Continued)

FOREIGN PATENT DOCUMENTS

| | | |
|---|---|---|
| JP | 2006-325042 A | 11/2006 |
| JP | 2008-139901 A | 6/2008 |

(Continued)

OTHER PUBLICATIONS

English translation of document C1 (International Search Report (PCT/ISA/210) dated Aug. 30, 2016) previously filed on Sep. 8, 2017 (one page).

(Continued)

*Primary Examiner* — Nigar Chowdhury
(74) *Attorney, Agent, or Firm* — Crowell & Moring LLP

(57) ABSTRACT

A memory portion stores automated reproducing setting data that associates content input sources with necessariness/unnecessariness of automated reproduction of content. A control portion, when an operation-display portion or a remote control reception portion accepts selection of a content input source, judges whether or not automated reproduction is necessary on content that is inputted from the currently selected input source, based on the automated reproducing setting data. Also, the control portion starts outputting, at an audio signal output portion and a video signal output portion, a reproducing signal on the content that is inputted from the currently selected input source, when judging that automated reproduction of the content is necessary.

12 Claims, 4 Drawing Sheets

| CONTENT INPUT SOURCE | REPRODUCING FORM | AUTOMATED REPRODUCTION NECESSARY /UNNECESSARY |
|---|---|---|
| ANALOG EXTERNAL INPUT PORTION | — | NECESSARY |
| DIGITAL EXTERNAL INPUT PORTION | — | NECESSARY |
| DLNA SERVER | — | UNNECESSARY |
| NET RADIO | — | NECESSARY |
| STREAMING SERVICES | PLAY LIST | UNNECESSARY |
| | ALBUM | UNNECESSARY |
| | FOLDER | NECESSARY |
| | RADIO | NECESSARY |
| ⋮ | ⋮ | ⋮ |
| USB INPUT PORTION | — | UNNECESSARY |
| TUNER | — | NECESSARY |
| ⋮ | ⋮ | ⋮ |

(51) Int. Cl.
*G11B 27/00* (2006.01)
*H04N 5/76* (2006.01)
*H04N 9/80* (2006.01)
*H04N 21/436* (2011.01)
*H04N 21/81* (2011.01)

(56) References Cited

U.S. PATENT DOCUMENTS

| | | | |
|---|---|---|---|
| 2008/0063373 A1* | 3/2008 | Hamada | G11B 27/105 386/338 |
| 2009/0237573 A1* | 9/2009 | Hornback | G08C 17/02 348/734 |
| 2010/0303445 A1 | 12/2010 | Maegaki et al. | |
| 2013/0028576 A1* | 1/2013 | Ushimaru | H04L 12/2812 386/326 |
| 2014/0281911 A1 | 9/2014 | Kim | |

FOREIGN PATENT DOCUMENTS

| | | |
|---|---|---|
| JP | 2010-278578 A | 12/2010 |
| JP | 2014-182827 A | 9/2014 |

OTHER PUBLICATIONS

International Search Report (PCT/ISA/210) issued in PCT Application No. PCT/JP2016/065462 dated Aug. 30, 2016 (2 pages).
Japanese-language Written Opinion (PCT/ISA/237) issued in PCT Application No. PCT/JP2016/065462 dated Aug. 30, 2016 (5 pages).

* cited by examiner

FIG. 2

| CONTENT INPUT SOURCE | REPRODUCING FORM | AUTOMATED REPRODUCTION NECESSARY /UNNECESSARY |
|---|---|---|
| ANALOG EXTERNAL INPUT PORTION | — | NECESSARY |
| DIGITAL EXTERNAL INPUT PORTION | — | NECESSARY |
| DLNA SERVER | — | UNNECESSARY |
| NET RADIO | — | NECESSARY |
| STREAMING SERVICES | PLAY LIST | UNNECESSARY |
| | ALBUM | UNNECESSARY |
| | FOLDER | NECESSARY |
| | RADIO | NECESSARY |
| | ⋮ | ⋮ |
| USB INPUT PORTION | — | UNNECESSARY |
| TUNER | — | NECESSARY |
| ⋮ | ⋮ | ⋮ |

CONTENT REPRODUCING APPARATUS
AND CONTENT REPRODUCING METHOD

CROSS REFERENCE TO RELATED
APPLICATIONS

The present application is a continuation of International Application No. PCT/JP2016/065462, filed on May 25, 2016, the entire contents of which is incorporated herein by reference.

BACKGROUND OF THE INVENTION

1. Field of the Invention

The present invention, in one aspect thereof, relates to a technology to output a reproducing signal of a content inputted from a selected input source.

2. Description of the Related Art

Conventionally, a disc reproducing apparatus having a disc tray to load/unload an optical disc there has been one that is configured in such a manner as to close the disc tray and thereafter start automated reproduction of the disc if a play key is operated when the disc tray is open. With this configuration, since it is unnecessary to perform an operation to close the disc tray and an operation to start reproduction of the content stored on the disc separately, operability by user can be improved.

Also, from a standpoint of cost and/or design of the apparatus main body, there is another type of a disc reproduction apparatus not provided with a play key on the front panel. As to the disc reproducing apparatus of this type, a configuration in which the disc tray is closed and thereafter automated reproduction of the disc is started if a predetermined operation is performed when the disc tray is open is proposed (see JP 2010-278578 A). The predetermined operation is, for example, an operation of pressing a disk tray open/close key consecutively.

Further, there is content reproducing apparatus such as AV receiver and/or the like that outputs a reproducing signal on content inputted from an input source. The AV receiver can connect to a VCR (Video Cassette Recorder), a disc reproducing apparatus, a STB (Set Top Box), DLNA (Digital Living Network Alliance) server (a registered trademark), Web servers, a USB and so forth as content input sources.

To a user who listens to the content, there may be some content automated reproduction is desired for, while there may be other content automated reproduction is not desired for.

For example, one of the streaming services provided by Web servers includes content in a form called radio that keeps on play one or more pieces of music endlessly. Also, other ones of the streaming services provided by Web servers include a content in forms called album, play list, folder and the like that plays registered pieces of music. The content automated play is desired for by user may be, for example, content used as BGM. On the other hand, the content automated reproduction is not desired for by user may be supposed to be content user would like to settle down to listen to.

However, either one of forms contents to use as BGM or to settle down to listen to may be switched depending on user's listening style.

For these reasons, there has been growing demand for a content reproducing apparatus such as AV receiver or the like that allows a user to make a setting on whether or not automated reproduction of content is necessary depending on the user's listening style.

The present invention, in one aspect thereof, is directed to providing a technology that allows, with a simple configuration, a user to make a setting on whether or not automated reproduction of content is necessary depending on the user's listening style.

SUMMARY OF THE INVENTION

In order to achieve the above-mentioned goal, a content reproducing apparatus according to one aspect of the present invention is configured as described below.

An output portion outputs a reproducing signal of a content. A selection acceptance portion accepts a selection of a content input source. Content input sources include a VCR (Video Cassette Recorder), a disc reproducing apparatus, a STB (Set Top Box), DLNA (Digital Living Network Alliance) server (a registered trademark), Web servers, a USB and so forth.

A memory portion stores automated reproducing setting data that associates the content input sources with necessariness/unnecessariness of automated reproduction of the content. At least one processing circuit is configured as a judgment portion performs, when the selection acceptance portion accepts the selection of the content input source, a first judgment process that judges whether or not automated reproduction is necessary on content that is inputted from a currently selected input source, based on the automated reproducing setting data. An automated reproducing control portion starts outputting, at the output portion, a reproducing signal on the content that is inputted from the currently selected input source, when the judgment portion judges that automated reproduction of the content is necessary.

In this manner, this configuration allows user to make a setting on whether or not automated reproduction of content is necessary for each content input source. The content reproducing apparatus performs automated reproduction of content if the selected input source is a content input source associated with necessariness of automated reproduction. Also, the content reproducing apparatus does not perform automated reproduction of content if the selected input source is a content input source associated with unnecessariness of automated reproduction. Therefore, with a simple configuration, it is possible for user to make a setting on whether or not automated reproduction of content is necessary depending on the user's listening style. Additionally, usability by user improves.

Here, automated reproduction of content means starting the reproduction of the content automatically that is inputted from the selected input source, without waiting for user's operation related to the start of reproduction.

The present invention, in one aspect thereof, allows, with a simple configuration, user to make a setting on whether or not automated reproduction of content is necessary depending on the user's listening style.

BRIEF DESCRIPTION OF THE DRAWINGS

FIG. 2 is a chart showing an example of automated reproducing setting data.

DETAILED DESCRIPTION OF THE PREFERRED EMBODIMENTS

A content reproducing apparatus according to an embodiment of the present invention is explained below.

Figure 1:
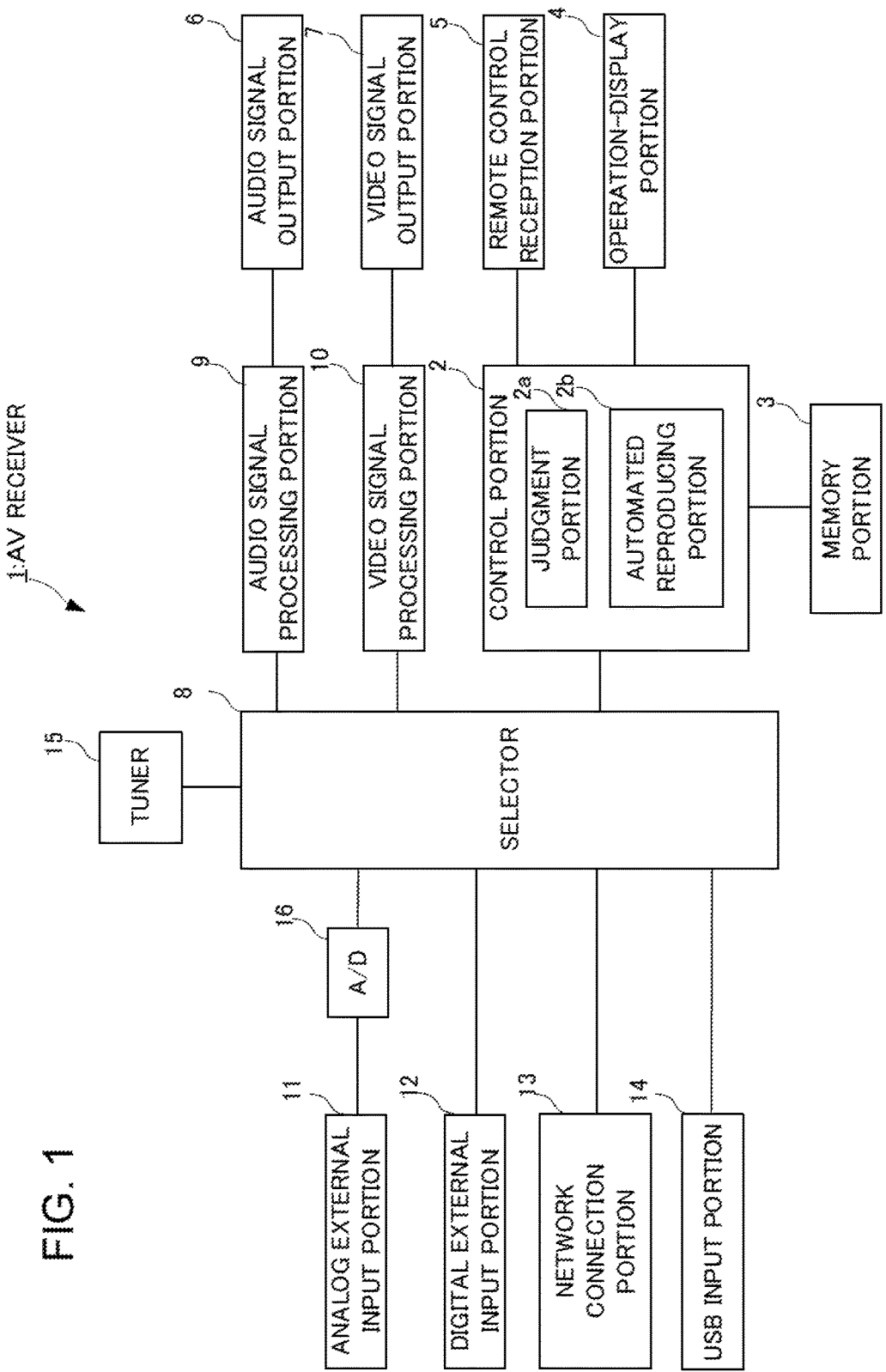
FIG. 1 is a block diagram showing a configuration of a main part of an AV receiver according to an embodiment of the present invention.

FIG. 1 is a block diagram showing a configuration of a main part of an AV receiver according to the embodiment. The AV receiver 1 corresponds to the content reproducing apparatus in this embodiment. The AV receiver 1 is connectable to a plurality of content input sources. The AV receiver 1, accepting a selection of a content input source, outputs a reproducing signal of content inputted from the selected input source. The content input sources include a VCR (Video Cassette Recorder), a disc reproducing apparatus, a STB (Set Top Box), DLNA (Digital Living Network Alliance) server (a registered trademark), Web servers, a USB and so forth.

As shown in FIG. 1, the AV receiver 1 includes a control portion 2, a memory portion 3, an operation-display portion 4, a remote control reception portion 5, an audio signal output portion 6, a video signal output portion 7, a selector 8, an audio signal processing portion 9, a video signal processing portion 10, an analog external input portion 11, a digital external input portion 12, a network connection portion 13, a USB input portion 14, a tuner 15 and an A/D conversion portion 16.

The control portion 2 controls operation of the main body of the AV receiver 1. Although described later in detail, the control portion 2 has a judgment portion 2*a*, and an automated reproducing control portion 2*b*.

The judgment portion 2*a* and the automated reproducing control portion 2*b* of control portion 2 is executed by a processing circuit, such as CPU (by Central Processing Unit) or DSP (Digital Signal Processing).

To the analog external input portion 11, the digital external input portion 12, the network connection portion 13 and the USB input portion 14, devices that become content input sources are connected. To the analog external input portion 11, for example, a VCR (Video Cassette Recorder) is connected. To the digital external input portion 12, for example, a disc reproducing apparatus and a STB (Set Top Box) are connected. To the network connection portion 13, for example, Web servers delivering radio broadcasts in streaming through Internet, Web servers delivering classical, pops, rock music and so forth in streaming through Internet, Web servers delivering movies, dramas and/or the like in streaming through Internet, DLNA server (a registered trademark) and so forth are connected. To the USB input portion 14, a USB memory storing content is connected.

Further, devices that become content input sources are not limited to the above-mentioned devices, but the apparatus may be configured so that other kinds of devices (for example, SD memory card, hard disc drive, smart phone, etc.) are connectable. Also, devices connected to the analog external input portion 11, the digital external input portion 12 and the network connection portion 13 are not limited to those illustrated.

The tuner 15 receives FM broadcasts and so forth, and plays thereof.

The A/D conversion portion 16 converts analog signals of the content inputted to the analog external input portion 11 into digital signals, and inputs thereof to the selector 8. The digital external input portion 12, the network connection portion 13 and the USB input portion 14 input digital signals of the inputted content to the selector 8. The tuner 15 inputs digital signals of the content on the received FM broadcasts to the selector 8.

The digital signals of the content inputted to the selector 8 include at least either of audio signal and video signal. That is, the digital signals of the content inputted to the selector 8 may include an audio signal and a video signal. Also, the digital signal of the content inputted to the selector 8 may include only video signal, without including audio signal. Further, the digital signals of the content inputted to the selector 8 may include only an audio signal, without including a video signal.

The selector 8 selects a content input source according to an instruction from the control portion 2. Also, the selector 8 outputs an audio signal and a video signal of the content inputted from the input source selected at that time according to the instruction from the control portion 2.

The control portion 2 gives the selector 8 the instruction to select a content input source, and the instruction to output an audio signal and a video signal of the content inputted from the input source selected at that time, separately. That is, the selector 8, even when selecting a content input source according to the instruction from the control portion 2, will not output an audio signal or a video signal unless there is an instruction to output the audio signal and the video signal from the control portion 2.

To the audio signal processing portion 9, an audio signal output from the selector 8 is inputted. The audio signal processing portion 9 performs sound quality adjustment and so forth corresponding to the inputted audio signal.

To the video signal processing portion 10, a video signal output from the selector 8 is inputted. The video signal processing portion 10 performs image quality adjustment and so forth corresponding to the inputted video signal.

To the audio signal output portion 6, a speaker is connected. The audio signal (analog signal) processed at the audio signal processing portion 9 is inputted to the speaker through the audio signal output portion 6. Also, to the video signal output portion 7, a display device is connected. The video signal (digital signal, or analog signal) processed at the video signal processing portion 10 is inputted to the display device through the video signal output portion 7. The audio signal output portion 6 and the video signal output portion 7 correspond to the output portion in this embodiment. The audio signal output from the audio signal output portion 6 and the video signal output from the video signal output portion 7 correspond to the reproducing signal of the content in this embodiment.

The remote control reception portion 5 receives a remote control signal (infrared signal) transmitted from a remote controller. Also, the remote control reception portion 5 receives the received remote control signal from the remote control. The remote control reception portion 5 analyses the received remote control signal and determines a command code to the main body of the AV receiver 1. The remote control reception portion 5 inputs the determined command code to the control portion 2. The control portion 2 controls operation of the main body of the AV receiver 1 depending on the command code inputted from the remote control reception portion 5.

Also, the operation-display portion 4 displays a screen that depends on a user's key operation, and inputs a command code that depends on the user's key operation to the control portion 2. The control portion 2 controls operation of the main body of the AV receiver 1 depending on the command code inputted from the operation-display portion 4.

The operation-display portion 4 and the remote control reception portion 5 correspond to the selection acceptance portion in this embodiment.

The memory portion 3 stores mode data used when the main body of the AV receiver 1 is operating, the automated reproducing setting data and so forth. The mode data indicate which way to take, in an auto mode or in a manual mode as shown below, to judge whether or not automated reproduction of content is necessary. Here, the automated reproduction of content means automatically starting reproduction of the content that is inputted from the selected input source, without waiting for user's operation related to the start of reproduction.

The auto mode judges whether or not automated reproduction of content is necessary, without using the automated reproducing setting data stored in the memory portion 3. The manual mode judges whether or not automated reproduction of content is necessary, using the automated reproducing setting data stored in the memory portion 3. The judgment portion 2a of the control portion 2 judges whether or not automated reproduction of a content is necessary, when power to the main body of the AV receiver 1 is turned on, and when at least one of content input sources selected is accepted. The process of judging whether or not automated reproduction of content is necessary in the manual mode corresponds to a first judgment process in this embodiment. The process of judging whether or not automated reproduction of content is necessary in the auto mode corresponds to a second judgment process in this embodiment. Then, when the judgment portion 2a judges that automated reproduction of the content is necessary, the automated reproducing control portion 2b of the control portion 2 instructs the selector 8 to output the audio signal and the video signal.

FIG. 2 is a chart showing an example of automated reproducing setting data stored in the memory portion 3. The automated reproducing setting data, as shown in FIG. 2, associates content input sources, content reproducing forms and necessariness/unnecessariness of automated reproduction of content with each other. In the example shown in FIG. 2, the analog external input portion 11, the digital external input portion 12, DLNA server (a registered trademark), NET RADIO, streaming services, the USB input portion 14 and the tuner 15 are chosen as content input sources. The DLNA server (a registered trademark), NET RADIO and streaming services are content input sources that are connected to the network connection portion 13.

Also, the analog external input portion 11, the digital external input portion 12, DLNA server (a registered trademark), NET RADIO, the USB input portion 14 and the tuner 15 are associated with necessariness/unnecessariness of automated reproduction of content, without being classified by content reproducing forms. Whereas, the streaming services are associated with necessariness/unnecessariness of automated reproduction of content, being classified according to the reproducing forms of play list, album, folder, radio, etc. The play list is a reproducing form where the content that is registered in a designated play list is sequentially reproduced. The album is a reproducing form where the content that is registered in a designated album is sequentially reproduced. The folder is a reproducing form where the content that is registered in a designated folder is sequentially reproduced. The radio is a reproducing form where one or more pieces of music as contents kept on being reproduced endlessly.

Besides, the automated reproducing setting data may be ones that associate the analog external input portion 11, the digital external input portion 12, DLNA server (a registered trademark), NET RADIO, the USB input portion 14 and the tuner 15 with necessariness/unnecessariness of automated reproduction of content, being classified according to the content reproducing forms in the same manner as the streaming services. Also, the streaming service may be one that is associated with necessariness/unnecessariness of automated reproduction of content, without being classified by the content reproducing form.

User can make a setting change of the mode data stored in the memory portion 3, and/or a setting change of the automated reproducing setting data stored in the memory portion 3, by performing a predetermined operation on the remote controller or the operation-display portion 4. The setting change of the mode data is carried out by setting a mode to select to either auto mode or manual mode. The setting change of the automated reproducing setting data is carried out by making a setting on whether or not automated reproduction of content is necessary, either for each input source or for each reproducing form. That is, a user can change the mode data and the automated reproducing setting data stored in the memory portion 3 freely.

Figure 3:
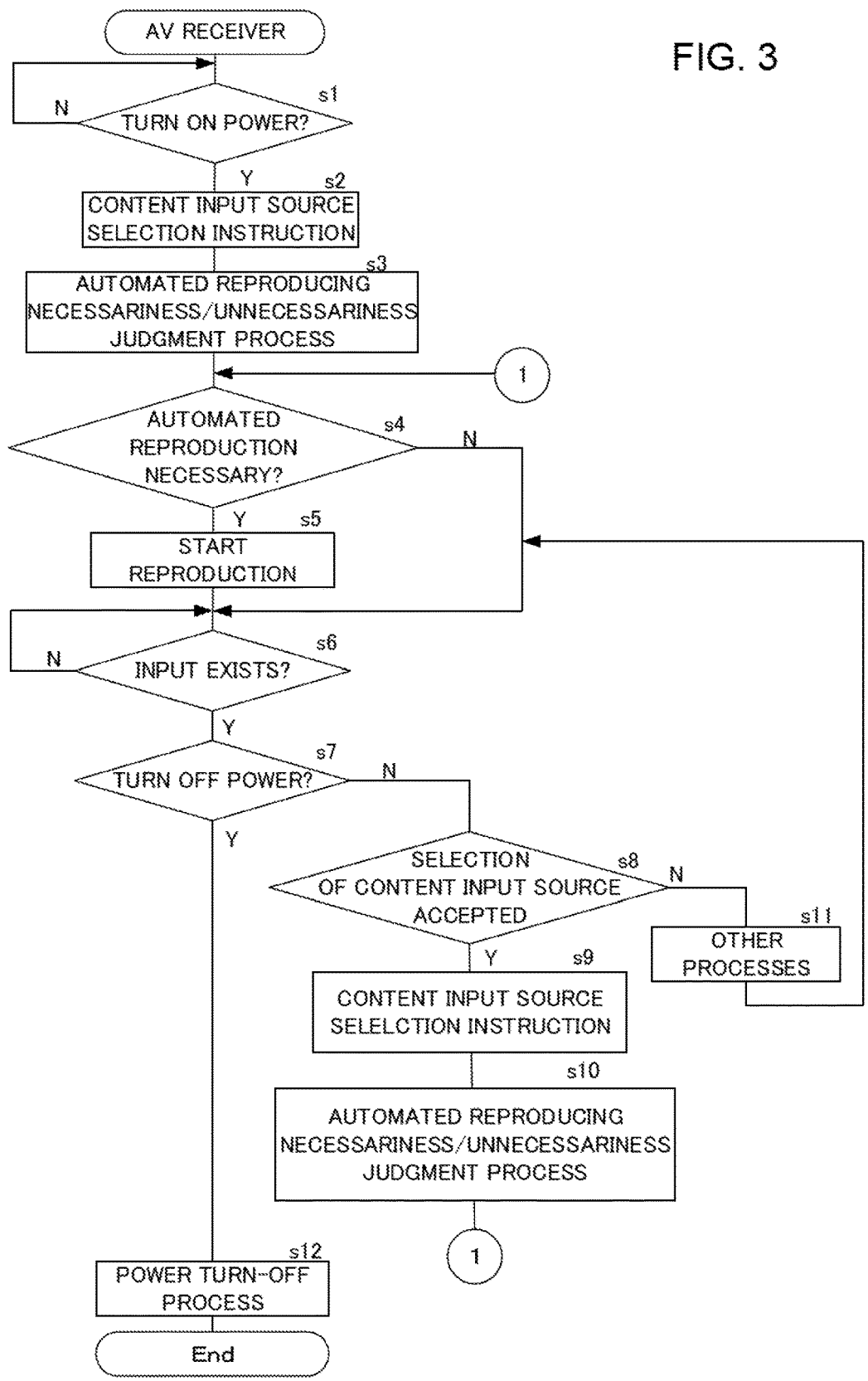
FIG. 3 is a flow chart showing an example of an operation of the AV receiver.

FIG. 3 is a flow chart showing an example of an operation of the AV receiver. The control portion 2 instructs the selector 8 to select a content input source (s2) when power to the main body of the AV receiver 1 is turned on (s1). At step s2, for example, the control portion 2 may instruct the selector 8 to select a content input source that had been selected at the time of previous power turn-off. Also, at step s2, the control portion 2 may instruct the selector 8 to select a predetermined content input source. The selector 8 selects the content input source according to the instruction from the control portion 2.

However, at this time, the selector 8 neither output the audio signal nor the video signal of the content inputted from a currently selected input source.

The judgment portion 2a of the control portion 2 performs the automated reproducing necessariness/unnecessariness judgment process that judges whether or not automated reproduction is necessary on the content inputted from the input source selected at step s2 (s3). Details of the automated reproducing necessariness/unnecessariness judgment process is described later.

The control portion 2, when judging in the automated reproducing necessariness/unnecessariness judgment process that automated reproduction is necessary, starts reproduction of the content inputted from the input source selected at step s2 (s4, s5). At step s5, the automated reproducing control portion 2b of the control portion 2 instructs the selector 8 to output the audio signal and the video signal of the content. The selector 8 starts outputting the audio signal and the video signal of the content inputted from the input source selected at this time. As a result, outputting the audio signal of the content is started at the audio signal output portion 6. Also, outputting the video signal of the content is started at the video signal output portion 7.

The control portion 2, when starting reproduction of the content at step s5, waits for an input to the AV receiver 1 main body (s6). Also, the control portion 2, when the judgment portion 2a judging in the automated reproducing necessariness/unnecessariness judgment process that automated reproduction is unnecessary, waits for user's input to the AV receiver 1 main body at step s6, without starting reproduction of the content at step s5.

At step s6, the operation-display portion 4 and the remote control reception portion 5 accept the user's input.

The control portion 2, upon accepting the user's input on turning-off power to the main body of the AV receiver 1, performs a power turn-off process and ends the process (s7, s12).

Also, the control portion 2, upon accepting the user's input on selecting a content input source, instructs the selector 8 to select the currently accepted content input source (s8, s9). The selector 8 selects the content input source according to the instruction from the control portion 2.

However, at this time, the selector 8 neither outputs the audio signal nor the video signal of content inputted from currently selected input source.

The judgment portion 2a performs the automated reproducing necessariness/unnecessariness judgment process that judges whether or not automated reproduction is necessary on the content inputted from the input source selected at step s9 (s10), and returns to step s4. The step s10 is the same process as step s3, and details are described later.

Moreover, the control portion 2, upon accepting the user's input on matters other than the above-mentioned turning-off power to the main body of the AV receiver 1 and selecting a content input source, performs a process (another process) depending on the input (s11), and returns to step s6. Matters to input other than turning-off power to the main body of the AV receiver 1 and selecting a content input source include, for example, starting reproduction of content, stopping reproduction of content, setting change of the mode data stored in the memory portion 3, and setting change of the automated reproducing setting data stored in the memory portion 3.

Figure 4:
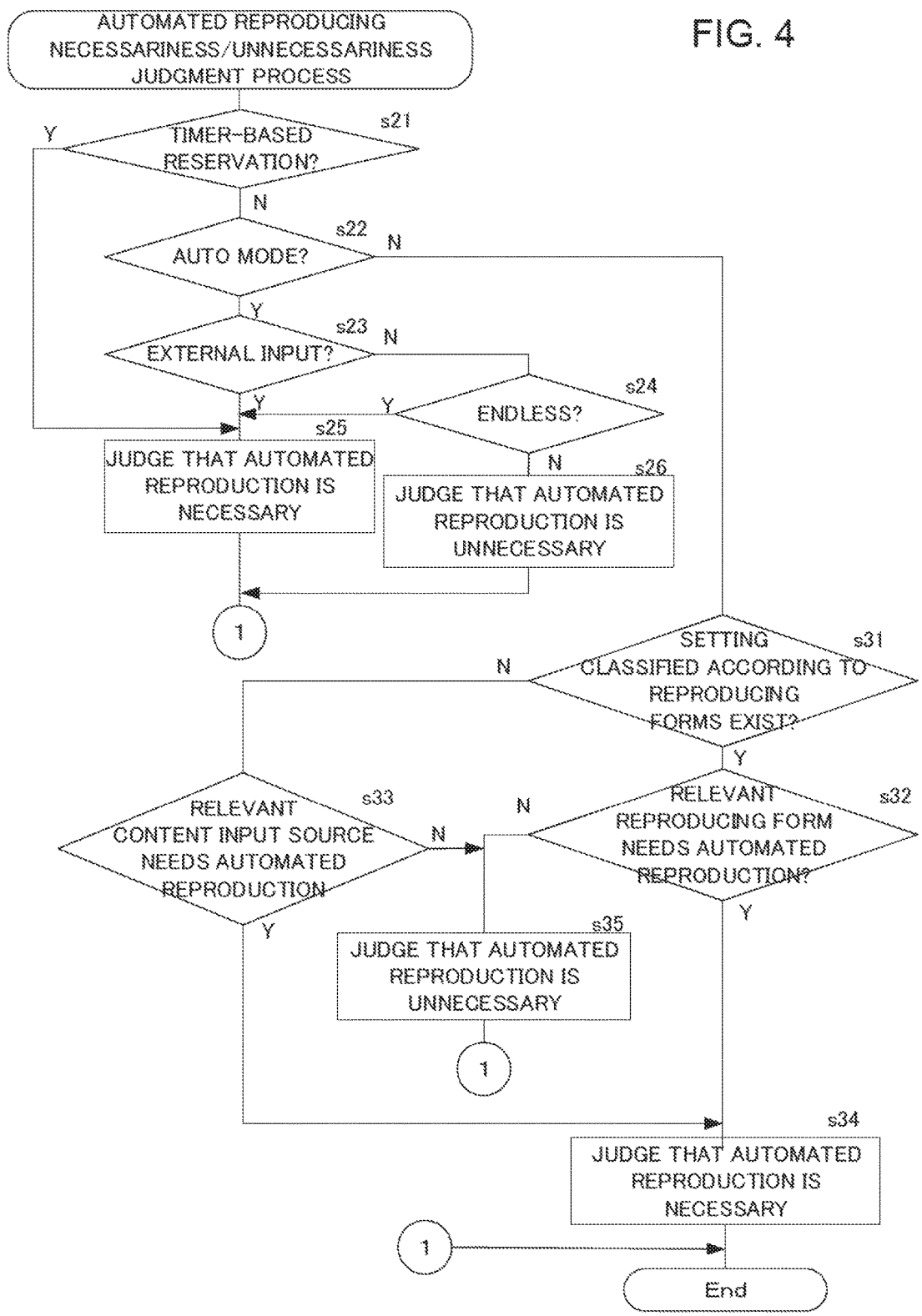
FIG. 4 is a flow chart showing an example of an automated reproducing necessariness/unnecessariness judgment process.

Subsequently, the automated reproducing necessariness/unnecessariness judgment process at step s3 and step s10 is explained. FIG. 4 is a flow chart showing an example of an automated reproducing necessariness/unnecessariness judgment process. The judgment portion 2a of the control portion 2 performs the automated reproducing necessariness/unnecessariness judgment process. The judgment portion 2a judges whether or not the current power turn-on at step s1 is one caused by a timer-based reservation (s21). The timer-based reservation includes functions such as alarm reservation, audio recording reservation, video recording reservation and so forth.

The judgment portion 2a, when judging that the current power turn-on is one caused by a timer-based reservation, judges that automated reproduction of the content is necessary (s25), and ends the process.

The judgment portion 2a, when judging that the current power turn-on is not one caused by a timer-based reservation, judges whether the currently selected mode is an auto mode or a manual mode (s22), based on the mode data stored in the memory portion 3. The judgment portion 2a, when judging that the currently selected mode is the auto mode, judges whether or not the currently selected content input source is an external input (s23). Here, an external input means a device connected to the analog external input portion 11 or a device connected to the digital external input portion 12. The judgment portion 2a judges a content input source to be an external input when the currently selected content input source is a device connected to the analog external input portion 11 or a device connected to the digital external input portion 12. On the other hand, the judgment portion 2a judges a content input source not to be an external input when the currently selected content input source is any one of a device connected to the network connection portion 13, a device connected to the USB input portion 14 and the tuner 15.

The judgment portion 2a, when judging a content input source to be an external input, judges that automated reproduction of the content is necessary (s25), and ends the process.

The judgment portion 2a, when judging a content input source not to be an external input, judges whether a reproducing form of the content inputted from the currently selected input source is one in which the content keeps on being reproduced endlessly, or another in which reproduction of the content ends by a predetermined unit (step s24). Among reproducing forms in which the content keeps on being reproduced endlessly are reproducing forms such as NET RADIO, radio in streaming services, etc., and FM broadcasts received by the tuner 15. And among reproducing forms in which reproduction of the content ends by a predetermined unit are reproducing forms such as a play list, album, folder, etc. in streaming services.

The judgment portion 2a, when judging that the reproducing form of the content inputted from the currently selected input source is one in which the content keeps on being reproduced endlessly, judges that automated reproduction of the content is necessary (s25), and ends the process. Because the content of the form to be reproduced endlessly is used as BGM by many users, as to such content the judgment portion 2a in this embodiment is configured so as to judge that automated reproduction of the content is necessary at step s25. On the other hand, the judgment portion 2a, when judging that the reproducing form of the content inputted from the currently selected input source is not one in which the content keeps on being reproduced endlessly (i.e., but the other one in which reproduction of the content ends by a predetermined unit), judges that automated reproduction is unnecessary (s26), and ends the process.

Moreover, although turning on power caused by a timer-based reservation is regarded as a situation where the judgment that automated reproduction of the content is necessary is made in this embodiment, situations other than turning on power caused by a timer-based reservation may be set to conditions for the judgment that automated reproduction is necessary to be made.

Also, the judgment portion 2a, when judging the currently selected mode to be a manual mode at step s22, judges whether or not the currently selected content input source is an input source with settings classified according to reproducing forms (s31). The judgment portion 2a makes a judgment based on the automated reproducing setting data stored in the memory portion 3. In the example shown in FIG. 2, when the currently selected content input source is a streaming service, the judgment portion 2a judges the content input source to be one with settings classified according to reproducing forms. Also, when the currently selected content input source is any one of DNA server (a registered trademark), NET, RADIO, the USB input portion 14 or the tuner 15, the judgment portion 2a judges the content input source to be one without settings classified according to reproducing forms.

The judgment portion 2a, when judging the content input source to be one with settings classified according to reproducing forms, judges whether the reproducing form of the content inputted from the currently selected input source is set to necessariness of automated reproduction, or set to unnecessariness of automated reproduction (s32). The judgment portion 2a makes a judgment based on the automated reproducing setting data stored in the memory portion 3. When the reproducing form of the content inputted from the currently selected input source is set to necessariness of automated reproduction, the judgment portion 2a judges that automated reproduction of the content is necessary (s34), and ends the process. When the reproducing form of the content inputted from the currently selected input source is set to unnecessariness of automated reproduction, the judgment portion 2a judges that automated reproduction of the content is unnecessary (s35), and ends the process.

Also, the judgment portion 2a, when judging the content input source to be one without settings classified according to reproducing forms, judges whether the currently selected content input source is set to necessariness of automated reproduction, or set to unnecessariness of automated reproduction (s33). The judgment portion 2a makes a judgment based on the automated reproducing setting data stored in the memory portion 3. When the currently selected content input source is set to necessariness of automated reproduction, the judgment portion 2a judges that automated reproduction of the content is necessary (s34), and ends the process. When the currently selected content input source is set to unnecessariness of automated reproduction, the judgment portion 2a judges that automated reproduction of the content is unnecessary (s35), and ends the process.

Here, the process related to steps s22-s26 corresponds to the second judgment process in this embodiment, and the process related to steps s31-s35 corresponds to the first judgment process in this embodiment.

In this manner, the AV receiver 1 in this embodiment judges whether or not automated reproduction of content is necessary, depending on an input source of the content and a reproducing form of the content. Also, with the AV receiver 1, for custom usability, users can finely make settings of necessariness/unnecessariness of automated reproduction of the content. Therefore, it is possible for users to make a setting on whether or not automated reproduction of the content is necessary depending on the user's listening style.

Additionally, the AV receiver 1 in this embodiment can be performed by software modification, without the need for additional hardware.

Moreover, a part of the configuration of the AV receiver 1 in this embodiment may be borne by a controller (such as controller applications operating on smart phones and/or PCs, dedicated control terminal, etc.) for the AV receiver 1. For example, it may be configured as shown below.

In this embodiment, the automated reproducing setting data are stored in a memory in the controller, and the controller performs the automated reproducing necessariness/unnecessariness judgment process (process shown in FIG. 4). The controller transmits a result of the automated reproducing necessariness/unnecessariness judgment to the AV receiver 1. When the result of the automated reproducing necessariness/unnecessariness judgment transmitted from the controller is necessariness of automated reproduction, the AV receiver 1 starts playing the content. When the result of the automated reproducing necessariness/unnecessariness judgment transmitted from the controller is unnecessariness of automated reproduction, the AV receiver 1 does not start reproducing the content.

Further, apparatus to which this embodiment is applicable is not limited to the above-mentioned AV receiver 1. This embodiment is applicable to various kinds of devices such as AV amplifier, audio amplifier (music reproducing amplifier), integrated speaker (apparatus configured by integrating a music reproducing portion, an amplifier and a speaker unit) and so forth.

What is claimed is:

1. A content reproducing apparatus comprising:
   an output portion that outputs a reproducing signal of content;
   a selection acceptance portion that accepts a selection of a content input source;
   a memory portion that stores automated reproducing setting data that associates content input sources with necessariness and unnecessariness of automated reproduction of content; and
   at least one processing circuit configured as:
      a judgment portion that performs, when the selection acceptance portion accepts the selection of the content input source, a first judgment process that judges whether or not automated reproduction is necessary on content that is inputted from a currently selected input source, based on the automated reproducing setting data; and
      an automated reproducing control portion that automatically starts outputting without waiting for a user's operation, at the output portion, a reproducing signal on the content that is inputted from the currently selected input source, when the judgment portion judges that automated reproduction of the content is necessary.

2. The content reproducing apparatus according to claim 1, wherein
   the memory portion stores the automated reproducing setting data that associates the content input sources, content reproducing forms and necessariness and unnecessariness of automated reproduction of content with each other.

3. The content reproducing apparatus according to claim 1, wherein
   the selection acceptance portion accepts a setting change of necessariness and unnecessariness of automated reproduction of content on the automated reproducing setting data stored in the memory portion.

4. The content reproducing apparatus according to claim 1, wherein
   the judgment portion performs a second judgment process that judges whether or not automated reproduction is necessary on the content that is inputted from the selected input source, based on a reproducing form of the content; and determines, when the selection acceptance portion accepts the selection of the content input source, which process to perform, the first judgment process or the second judgment process, to judge whether or not automated reproduction is necessary on the content that is inputted from the currently selected input source.

5. The content reproducing apparatus according to claim 4, wherein
   the judgment portion judges that automated reproduction is necessary when the content is the content whose reproducing form is endless.

6. The content reproducing apparatus according to claim 4, wherein
   the judgment portion judges that automated reproduction is necessary when the content is the content whose reproducing form is reserved.

7. A content reproducing method comprising:
   accepting a selection of a content input source at a selection acceptance portion;

performing, when accepting the selection of a content input source at a selection acceptance portion, a first judgment process that judges whether or not automated reproduction is necessary on content that is inputted from a currently selected input source, based on automated reproduction setting data stored in a memory portion that associates content input sources with necessariness and unnecessariness of automated reproducing of content; and automatically starting outputting without waiting for a user's operation, at an output portion, a reproducing signal on the content that is inputted from the currently selected input source, when a judgment that automated reproduction of the content is necessary is made.

8. The content reproducing method according to claim 7, the method including:

storing in the memory portion the automated reproducing setting data that associates the content input sources, content reproducing forms and necessariness and unnecessariness of automated production of content with each other.

9. The content reproducing method according to claim 7, the method including:

accepting at the selection acceptance portion a setting change of necessariness and unnecessariness of automated reproduction of content, on the automated reproducing setting data stored in the memory portion.

10. The content reproducing method according to claim 7, the method including:

performing a second judgment process that judges whether or not automated reproduction is necessary on the content that is inputted from the selected input source, based on a reproducing form of the content; and determining, when an accepting selection of a content input source, which process to perform, the first judgment process or the second judgment process, to judge whether or not automated reproduction is necessary on the content that is inputted from the currently selected input source.

11. The content reproducing method according to claim 10, the method including:

judging that automated reproduction is necessary when reproducing form of the content is endless.

12. The content reproducing method according to claim 10, the method including:

judging that automated reproduction is necessary when the reproducing form of content is reserved.

* * * * *